United States Patent [19]
Anderson

[11] Patent Number: 5,647,160
[45] Date of Patent: Jul. 15, 1997

[54] NETTING COLORED TO INDUCE FISH TO SWIM INTO NET

[75] Inventor: Ronald A. Anderson, Seattle, Wash.

[73] Assignee: Northwest International Development Corporation, Seattle, Wash.

[21] Appl. No.: 542,049

[22] Filed: Oct. 12, 1995

[51] Int. Cl.6 ................................................. A01K 71/00
[52] U.S. Cl. ........................................... 43/10; 43/4.5
[58] Field of Search ............................. 43/7, 10, 11, 14, 43/4, 4.5

[56] References Cited

U.S. PATENT DOCUMENTS

| | | | |
|---|---|---|---|
| 4,243,709 | 1/1981 | Morton | 428/195 |
| 4,457,959 | 7/1984 | Dornheim | 43/7 X |
| 4,466,331 | 8/1984 | Matheson | 43/7 X |
| 4,501,084 | 2/1985 | Mori | 43/7 X |
| 4,710,407 | 12/1987 | Keeton | 43/7 X |
| 4,834,368 | 5/1989 | Qualley | 43/11 X |
| 4,876,818 | 10/1989 | Fralick et al. | 43/7 |
| 5,339,557 | 8/1994 | Brundage et al. | 43/11 |
| 5,442,875 | 8/1995 | Brundage et al. | 43/11 |
| 5,484,313 | 1/1996 | Rachal et al. | 441/80 |

*Primary Examiner*—Joseph J. Hail, III
*Assistant Examiner*—Jay A. Stelacone
*Attorney, Agent, or Firm*—Ronald M. Anderson

[57] ABSTRACT

A gill net includes multiple sections dyed different colors. Fish (28) avoid sections of the net that are more visible and swim into one or more other sections of the net that are less visible in water. In a first embodiment (10) of the multi-colored net, an upper section (22) is colored to be visible to fish in water. A middle section of the net (24) is colored to generally blend with the water, while a lower section (26) is also colored to be visible to the fish. Different color schemes are used in other embodiments of the gill net. Fish attempting to swim over or under the sections of the net that are more visible become entrapped in the mesh within the section of the net that is less visible. Spaced-apart floats (16) are disposed along the top edge of the gill net, and a lead line (20) is threaded through the lower edge of the gill net to insure its vertical orientation in the water.

20 Claims, 2 Drawing Sheets

NETTING COLORED TO INDUCE FISH TO SWIM INTO NET

FIELD OF THE INVENTION

The present invention generally relates to fish netting, and more specifically, to a net that is deployed in water to float behind a boat, to entrap fish that fail to swim around the net.

BACKGROUND OF THE INVENTION

Various types of nets are used by commercial fishing vessels to harvest fish from the sea. Nets such as the purse seine are designed to be towed behind a trawler to trap the fish that are in the path of the moving net within a sock formed when the bottom of the net is drawn closed. In contrast, gill nets are typically deployed or laid out behind a fishing boat in a "J" pattern, but are not towed through the water after being deployed. Instead of seining the fish from the water with a moving net, the fish are ensnared when they swim into the gill net as it drifts behind the boat. The mesh of a gill net is sized so that only fish larger than a minimum size are taken. The heads of the fish pass through the mesh, and their gills will become entangled. Fish that are too small to be taken pass through the mesh unharmed. The gill net is subsequently drawn on board the boat using a power wench, and the fish that are entrapped in the mesh are manually extracted for storage on the boat until they are processed.

Gill nets are typically about one-quarter mile in length. The width of a gill net may be limited by the fishing regulations applicable in a particular commercial fishing zone. For example, in Bristol Bay, Canada, the nets are limited to 13 feet in width, while in the U.S., nets up to 60 feet wide are commonly used.

A float line is threaded through the top mesh of a gill net and typically supports floats spaced apart at about two foot intervals. A nylon sheathed lead line is normally threaded through the bottom mesh of the net, so that the net floats as a sheet, extending from the surface downwardly in a vertical orientation, with the lower edge of the net either dragging on the bottom or clear of it.

Fish that see a net will typically attempt to swim around it. Due to the length of a gill net, most fish attempting to avoid the net may try to swim above or below it. The width of the net and its visibility to the fish thus directly affect the number of fish that succeed in avoiding entanglement in the mesh by swimming around the net. A conventional gill net is generally a single color. The manufacturer may select a color for the net so that it is less visible to fish in water. However, algae, plankton, suspended sediment in the water, and depth can change the light absorption characteristics of sea water, and thus its color, so that a gill net that is colored to blend well with the water in one location may be substantially more visible to fish in the water at another location. Ideally, a gill net should be colored to be virtually invisible to the fish in the water so that they swim into the net and become entangled in its mesh. However, changing color absorption characteristics of sea water can make this a difficult goal to achieve under all conditions. Alternatively, it would be desirable to induce fish to swim into a portion of the net that is less visible than other portions of the net that are more visible, which the fish are attempting to avoid.

SUMMARY OF THE INVENTION

In accordance with the present invention, a net is defined that includes a first colored portion. A second colored portion of the net differs substantially in color from the first colored portion and is disposed adjacent to the first colored portion. The first colored portion has a color selected to be substantially more visible in water to fish than the second colored portion. As a result, fish are induced to swim away from the first colored portion that is visible to them, and toward the second colored portion, which they generally do not see. The fish thereby become entrapped in the net.

Preferably, the first colored portion comprises bands disposed on opposite sides of the second colored portion, extending generally longitudinally along the net. In one embodiment, the first colored portion includes a plurality of different colors that are more visible in water to fish than the second colored portion. In another embodiment, the bands on opposite sides of the central band are substantially the same color.

Another aspect of the present invention is directed to a method for inducing fish to enter a net. The method comprises the step providing a panel adapted to be deployed in water. A portion of the panel is colored with a color that is selected for its lack of visibility to fish in a water environment. Other portions of the panel are colored with at least one other color that is selected to be more visible to the fish when the panel is deployed in the water environment. The panel is deployed in the water environment, so that the portion that is more visible is generally surrounded with the other portions that are less visible to the fish. As noted above, the fish swim away from the portions colored to be more visible, toward the portion colored to be less visible and are entrapped within the panel.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
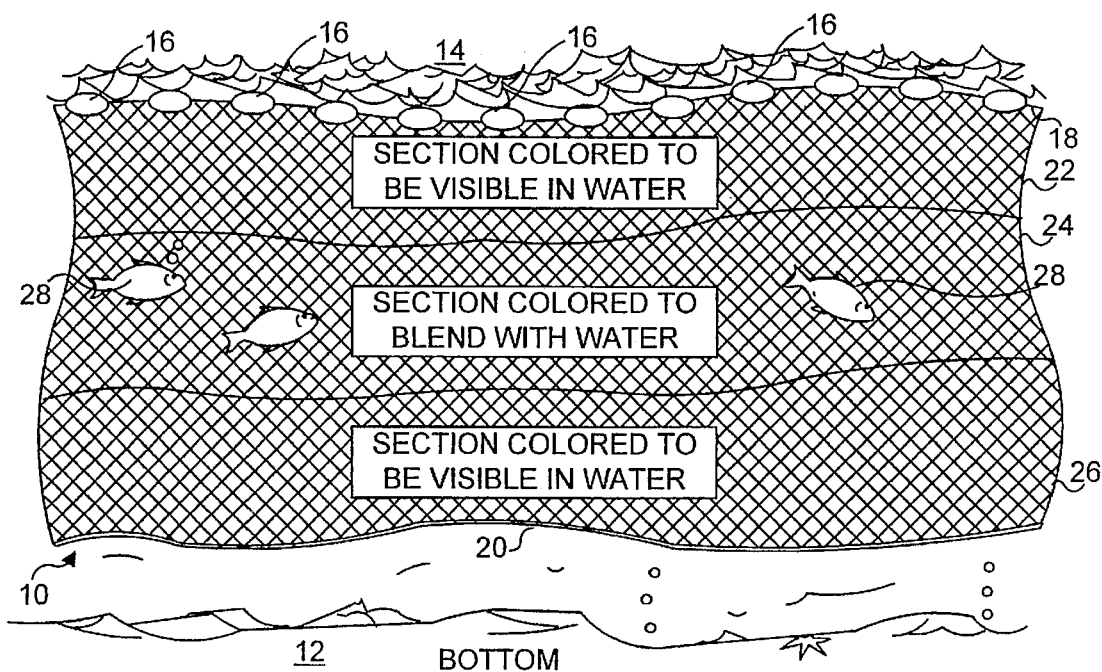
FIG. 1 is a schematic elevational view of a short longitudinal section of a first embodiment of the multi-colored net.

With reference to FIG. 1, a first embodiment of the present invention for a multi-colored net is generally identified by reference numeral 10. Only a small portion of multi-colored net 10 is shown in FIG. 1, since the net may be up to a quarter mile in length. As illustrated in this drawing, the multi-colored net floats generally in a vertical orientation above a sea bottom 12. The top edge of the multi-colored net floats at a surface 14 of the body of water in which it is deployed. To insure that the net floats like a vertical curtain, a plurality of floats 16 are disposed at spaced-apart intervals along a float line 18, which is threaded through the top mesh of the multi-colored net. To further stabilize the net in this vertical orientation, a lead line 20 is threaded through the mesh along the lower edge of the net. Lead line 20 typically comprises a plastic covered lead core; the lead core has a negative buoyancy that carries the lower portion of the net downwardly toward the bottom.

The multi-colored net comprises a mesh having a predefined size of opening as required by fishing regulations that are applicable in the area in which the net is deployed. These regulations also typically define a maximum width for the net, measured from the upper edge, through which float line 18 is threaded, to the lower edge of the net, through which lead line 20 is threaded.

A top section 22 of multi-colored net 10 is dyed a color that is selected to be visible to fish in the water. The upper section extends longitudinally along the net and horizontally in the water, from float line 18 downwardly to a center section 24. Center section 24 is colored to blend with the water and therefore to be generally invisible or substantially less visible to fish 28 in water than upper section 22. A lower section 26 of multi-colored net 10 is colored the same as upper section 22, so that it is also visible to fish in the water in which the net is deployed.

Since both upper section 22 and lower section 26 of multi-colored net 10 are visible to fish 28 swimming in the vicinity of the net, the fish will try to avoid swimming into the upper or lower sections, which are visible to the fish. Fish will attempt to avoid upper section 22, which they clearly see, by swimming below it, thereby becoming entangled in middle section 24, which the fish do not see or at least, not as well as the upper section of the net. Similarly, fish attempting to avoid lower section 26 are likely to attempt to swim above lower section 26, which they see, becoming entangled in center section 24, which the fish do not see as clearly as the lower section of the net. As a result, except for those fish that swim under lead line 20, away from the net, or around the distant ends of the net, fish are likely to swim into center section 24 of the net and to be entrapped as their gills catch in the mesh of the net. Consequently, a substantially larger percentage of fish will be caught in multi-colored net 10 than would be in a mono-colored net of the conventional type.

Figure 2:
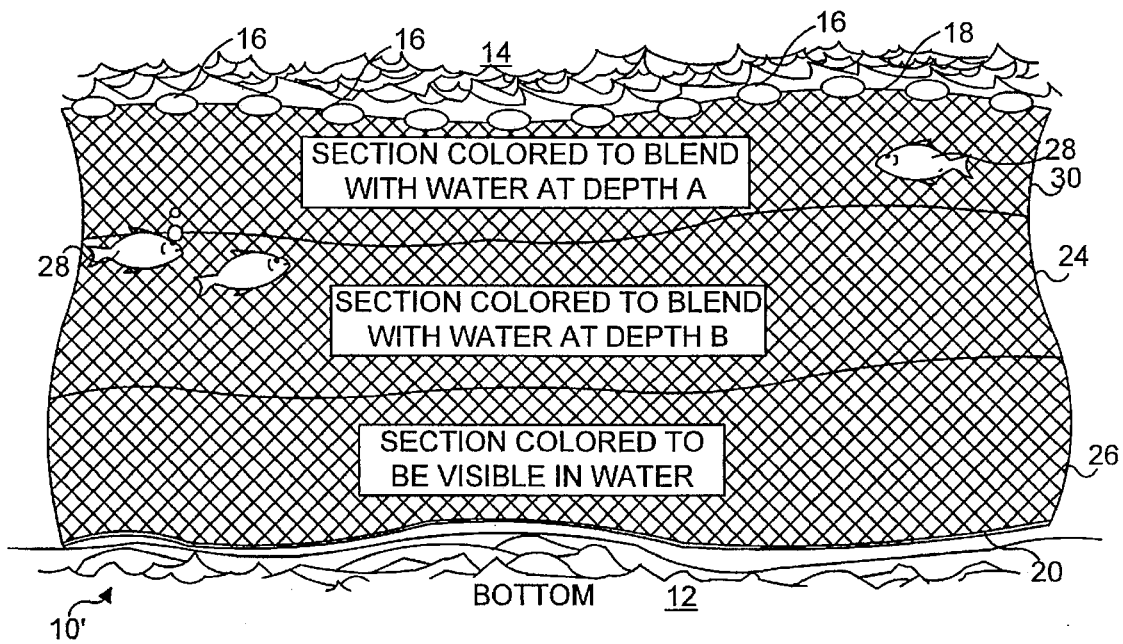
FIG. 2 is a schematic elevational view of a short longitudinal section of a second embodiment of the multi-colored net.

In FIG. 2, a second embodiment of a multi-colored net 10' is shown. In the Example shown in FIG. 2, multi-colored net 10' is configured substantially identical to multi-colored net 10, which was described above. However, as shown in the FIGURE, an upper section 30 of multi-colored net 10' is dyed a color that is selected to blend with water at a range of depth A. Range of depth A extends from the surface to about the bottom of upper section 30. Center section 24, which is substantially identical in color to that of the center section of multi-colored net 10, blends with water at a range of depth B, which extends from about the top edge of center section 24 to about its lower edge. In connection with this embodiment, it is recognized that the color absorption characteristics of water change with depth. Accordingly, multi-colored net 10' accommodates the differences in colors visible to fish at depth A, and at a deeper depth B. Lower section 26 is colored to be visible to fish in water at any depth from the surface to the lower edge of the net, just as in multi-colored net 10. Thus, both upper section 30 and center section 24 are substantially less visible to fish in water than lower section 26. Fish will attempt to avoid lower section 26 by swimming over it and will therefore become entangled in the mesh of either center section 24 or upper section 30.

As shown in FIG. 2, multi-colored net 10' is partially dragging over bottom 12 at some points and slightly clearing the bottom at other points along the length of the net. Accordingly, it is less likely that fish 28 will attempt to swim below the net, since there is insufficient clearance between the lower edge of the net and the bottom. Therefore, it is more likely that in attempting to avoid lower section 26, the fish will swim over it into center section 24 or upper section 30, both of which are much less visible to the fish in water than lower section 26. Again, the gills of the fish become entangled in the mesh of the net so that when the net is drawn onto a fishing boat (not shown), the fish can be extracted and placed in cold storage.

Figure 3:
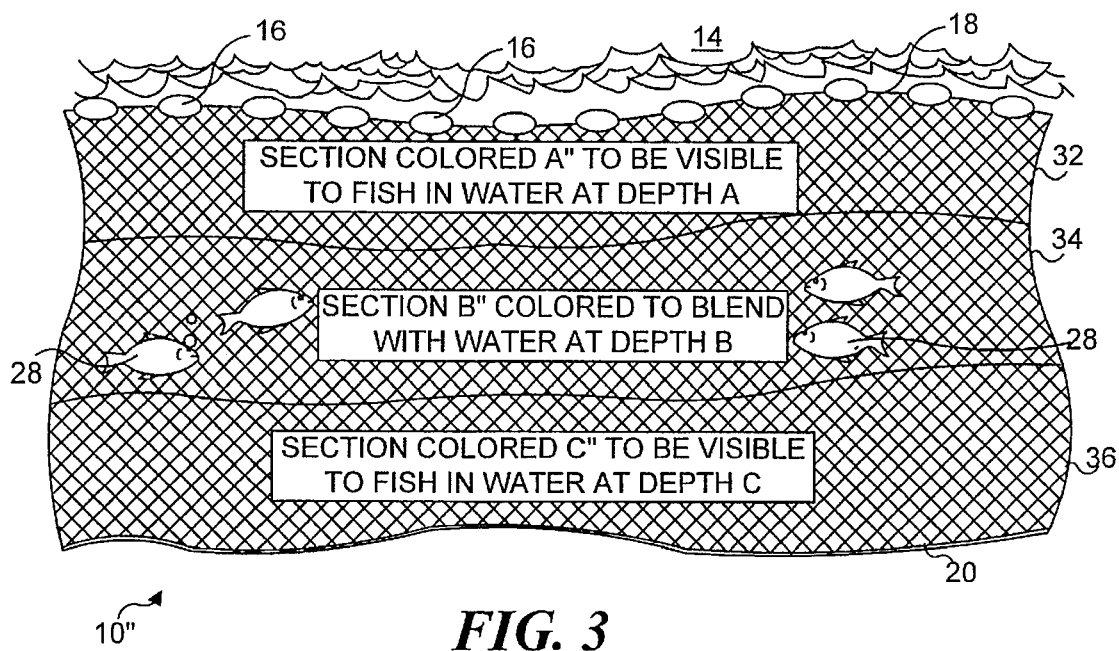
FIG. 3 is a schematic elevational view of a short longitudinal section of a third embodiment of the multi-colored net.

A multi-colored net 10" is illustrated in FIG. 3. This embodiment differs from the first two embodiments described above, since it includes an upper section 32 that is colored a hue A" selected to be visible to fish at a range of depth A. Range of depth A extends from the surface down to about the lower edge of upper section 32. Similarly, a center section 34 is colored a hue B" selected to generally blend with water at a range of depth B. The range of depth B generally corresponds to the depth from the top edge of center section 34 to its lower edge. Finally, a lower section 36 is colored a hue C" selected to be visible to fish in water at a range of depth C, where the range of depth C is a depth extending from about the top edge of lower section 36 to its bottom edge.

It will be apparent that the visibility of certain colors at different depths in a given body of water is subject to change, due to variations in water sedimentation content, sun angle on the surface, and other factors such as algae and plankton content of the water. However, the relative visibility of certain colors in the gray, blue, and green spectrum remains relatively constant. Thus, fish 28 are more likely to swim above lower section 36 to avoid it, since it is substantially more visible to the fish than center section 34, even though the color of center section 34 does not completely blend with the water at range of depth B. Similarly, fish 28 will swim below upper section 32 to avoid it, since center section 34 is substantially less visible to the fish in water than the upper section, regardless of variations in the water color absorption properties. As a consequence, multi-colored net 10" will also more likely ensnare a higher percentage of the available fish than a mono-colored net of the same construction and configuration.

Figure 4:
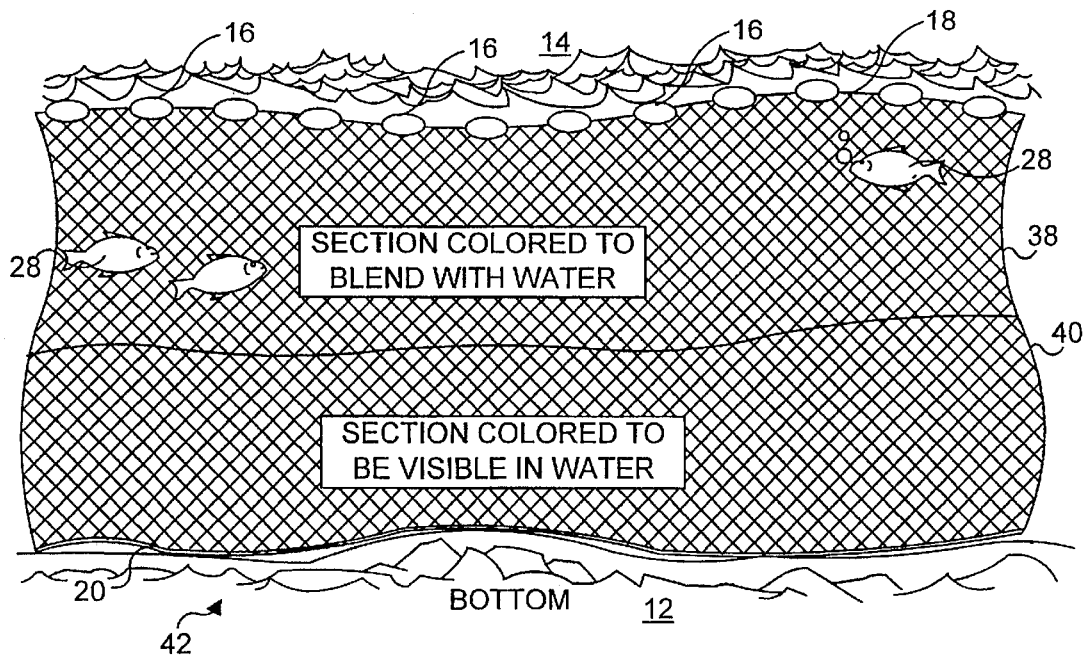
FIG. 4 is a schematic elevational view of a short longitudinal section of a fourth embodiment of the multi-colored net.

In FIG. 4, a fourth embodiment of a multi-colored net 42 is illustrated. This embodiment includes an upper section 38 that is colored to blend with the water, and a lower section 40, that is colored to be visible in water. Fish 28 are caught in the upper section, which they find much less visible than the lower section, since they swim above the lower section to avoid it. This embodiment is also shown hanging just clear or partly in contact with bottom 12. Accordingly, fish are unlikely to attempt to swim underneath lower section 40, due to inadequate clearance.

In the preceding four embodiments, the colors of the various sections change at what appears to be a distinct line. However, it is contemplated that the sections will be dyed by dipping the mesh of the net into an appropriate colored dye after the net is manufactured, so that there will likely be some diffusion of the dye color from one section into the adjacent section. However, this diffused color boundary between the adjacent sections will be relatively narrow in width compared to the width of each colored section, thereby having very little effect on the overall color of each section. The actual colors used for each of the sections in these four embodiments depend upon the particular color absorption characteristics of the water in which the nets will be deployed. For example, in net 10", upper section 32 is dyed a light gray, center section 34 is dyed a pale green, and lower section 36 is dyed a medium blue. Generally, water readily absorbs light in the visible red wavelengths, while light in the blue wavelength is absorbed substantially less. Blue objects are therefore generally more visible at a greater depth than red objects. In addition, the color absorption characteristics are affected by particular matter in the water, which tends to vary with different coastal locations. Therefore, it is contemplated that a plurality of multi-colored nets might be provided, so that fisherman can select an appropriately colored multi-colored net for use in a particular body of water. The color of the net selected would be in accord with any of the four embodiments described above and variations thereof that would likely induce fish to avoid one portion of the net that is more visible, swimming into and becoming entrapped in another portion of the net that is less visible in the water in which the net is deployed. It is also contemplated that the section of the net, which is less visible to the fish, can be dyed with a variable hue that changes color across the width of that section of the net to accommodate variations in the color absorption characteristics of the water with depth.

Although the present invention has been described in connection with the preferred forms of practicing it, and variations thereon, those of ordinary skill in the art will understand that many other modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A net comprising:
   (a) a first colored portion; and
   (b) a second colored portion, said second colored portion differing substantially in color from said first colored portion and having a color selected to blend with water in which the second colored portion is disposed, said first colored portion having a color selected to contrast with that of water in which the first colored portion is disposed, and thus to be substantially more visible to fish than said second colored portion, so that the fish are induced to swim away from the first colored portion and toward the second colored portion, and thereby to become entrapped in the second colored portion.

2. The net of claim 1, wherein the first colored portion comprises bands disposed on opposite sides of the second colored portion, extending generally longitudinally along the net.

3. The net of claim 1, wherein the first colored portion includes a plurality of different colors that are more visible in water to fish than the second colored portion.

4. Apparatus for use in entrapping and recovering fish, comprising:
   a net having a plurality of colored bands extending across it, including a central band that is disposed generally between adjacent bands and which has a color selected to be of a low contrast relative to water, and thus substantially less visible to fish in the water than colors of the adjacent bands, said colors of the adjacent bands being selected to be of a higher contrast relative to the water, so that the fish are induced to swim toward the central band, which is less visible to the fish in the water, in order to avoid the pair of adjacent bands, which are more visible to the fish in the water, and thereby are entrapped within the central band of the net.

5. The apparatus of claim 4, wherein the color of the central band is selected to substantially match an environmental color of water in which the net will be deployed.

6. The apparatus of claim 4, wherein a color of a first adjacent band has a lighter hue than a color of a second adjacent band, said net being thereby adapted to be disposed in the water with the first adjacent band having the color with the lighter hue disposed vertically above the central band, and the second adjacent band with a darker hue disposed below the central band.

7. The apparatus of claim 4, wherein the color of a first adjacent band is substantially the same as the color of the a second adjacent band.

8. The apparatus of claim 4, wherein the net is adapted to be deployed in the water with the bands extending longitudinally along the net and generally horizontally in the water.

9. The apparatus of claim 4, wherein the bands of the net are dyed after the net is manufactured.

10. Netting for entrapping and recovering fish, comprising:
    an open mesh panel having a length and a width and adapted to be deployed in water behind a marine craft, said panel comprising a plurality of different colored sections, including a central section and edge sections on opposite sides of the central section, said plurality of sections extending generally along the length of the panel;
    said plurality of sections including a central section that is colored with a water colored hue selected to substantially match a color of the water in a marine environment in which the panel will be deployed, making the central section substantially invisible in the marine environment to fish; and edge sections that are colored with a contrasting color that is substantially more visible in water to the fish, the fish being thus induced to swim toward the central section of the panel, which the fish do not readily see, to avoid the edge sections of the panel, which are visible to the fish.

11. The netting of claim 10, wherein the edge sections are substantially identical in color.

12. The netting of claim 10, wherein the edge sections are different in color, a first edge section having a darker contrasting color than a second edge section.

13. The netting of claim 10, wherein the panel is dyed after being manufactured.

14. A method for inducing fish to enter a net, comprising the steps of:
    (a) providing a water porous panel adapted to be deployed in water;
    (b) coloring a portion of the panel with a color that is selected to be substantially invisible to fish in a water environment;
    (c) coloring other portions of the panel with at least one other color that is selected to be readily visible to the fish when the panel is deployed in the water environment; and
    (d) deploying the panel in the water environment, so that the portion colored to be invisible is generally adjacent the other portions that are colored to be readily visible to the fish, so that the fish swim away from the other portions and toward the portion that is substantially invisible to the fish and are entrapped within the panel.

15. The method of claim 14, wherein the portion of the panel that is colored to be substantially invisible to the fish is a central band extending generally longitudinally along the panel, and wherein said portions of the panel that are colored to be readily visible extend as bands along opposite sides of the central band.

16. The method of claim 15, wherein the step of deploying the panel comprises the step of orienting the panel so that it is generally vertical in the water.

17. The method of claim 14, wherein the portions of the panel colored to be readily visible are generally of the same color.

18. The method of claim 14, wherein the portions of the panel colored to be readily visible are colored with a plurality of different colors.

19. The method of claim 14, wherein the portion of the panel colored to be substantially invisible is colored to match a color of the water environment in which the panel is deployed, so that said portion blends with the water environment.

20. The method of claim 14, further comprising the step of providing a plurality of differently colored panels, each panel corresponding to differently colored water environments, so that an appropriately colored panel is available to match the water environment in which the panel will be used.

* * * * *